United States Patent
Kalimuthu

(10) Patent No.: US 11,435,001 B2
(45) Date of Patent: Sep. 6, 2022

(54) GATE VALVE

(71) Applicant: Worldwide Oilfield Machine, Inc., Houston, TX (US)

(72) Inventor: Anand Kalimuthu, Houston, TX (US)

( * ) Notice: Subject to any disclaimer, the term of this patent is extended or adjusted under 35 U.S.C. 154(b) by 42 days.

(21) Appl. No.: 16/885,721

(22) Filed: May 28, 2020

(65) Prior Publication Data
US 2021/0215255 A1 Jul. 15, 2021

Related U.S. Application Data

(60) Provisional application No. 62/981,165, filed on Feb. 25, 2020, provisional application No. 62/961,452, filed on Jan. 15, 2020.

(51) Int. Cl.
*F16K 3/02* (2006.01)
*F16K 3/314* (2006.01)
*F16K 29/00* (2006.01)

(52) U.S. Cl.
CPC ........... *F16K 3/0236* (2013.01); *F16K 3/314* (2013.01); *F16K 29/00* (2013.01); *F16K 3/0254* (2013.01)

(58) Field of Classification Search
CPC ...... F16K 3/0236; F16K 3/314; F16K 3/0254; F16K 29/00; F16K 29/02
USPC ....... 251/326–329; 137/238–238, 242–245.5
See application file for complete search history.

(56) References Cited

U.S. PATENT DOCUMENTS

| | | | |
|---|---|---|---|
| 2,977,975 A * | 4/1961 | Allen ...................... | F16K 29/00 137/330 |
| 2,977,977 A | 4/1961 | Pennington | |
| 2,991,042 A | 7/1961 | Natho | |
| 3,244,399 A * | 4/1966 | Jones ..................... | F16K 31/143 251/327 |
| 3,378,224 A | 4/1968 | Boyle | |
| 3,379,405 A | 4/1968 | Natho | |
| 3,466,001 A | 9/1969 | Nelson | |
| 3,572,032 A | 3/1971 | Terry | |

(Continued)

FOREIGN PATENT DOCUMENTS

| | | |
|---|---|---|
| EP | 0280805 | 8/1988 |
| GB | 1464452 | 2/1977 |

(Continued)

OTHER PUBLICATIONS

PCT Search Report dated Apr. 29, 2021 for PCT/US2021/013059.
Written Opinion of the International Preliminary Examining Authority, PCT/US2021/013059, dated Nov. 24, 2021.

*Primary Examiner* — John Bastianelli
(74) *Attorney, Agent, or Firm* — Kenneth L. Nash; Thomas D. Nash

(57) ABSTRACT

The present invention discloses a gate valve with a first side and a second side relative the throughbore. A circular body cavity is on the first side and a rectangular body cavity on the second side and a portion of the first side whereby the gate is operable to move up and down within the body cavities. Due to the rectangular body cavity, the seats are slimmer than the gate. A skirt assembly is used which is inserted over the gate to cover the gate opening when the gate is moved to the closed position to prevent debris and other contaminants from entering the body cavity. Four U-shaped seals are mounted to provide that the gate valve is a bidirectional gate valve with upstream sealing having back up downstream sealing in case an upstream seal fails.

24 Claims, 8 Drawing Sheets

(56) References Cited

U.S. PATENT DOCUMENTS

| | | | |
|---|---|---|---|
| 3,765,642 A | 10/1973 | Nelson | |
| 3,842,854 A | 10/1974 | Wicke | |
| 3,889,922 A | 6/1975 | Peters | |
| 3,913,883 A | 10/1975 | Irwin | |
| 4,081,027 A | 3/1978 | Nguyen et al. | |
| 4,212,355 A | 7/1980 | Reardon | |
| 4,213,480 A * | 7/1980 | Orum | F16K 31/143 |
| | | | 137/556 |
| 4,215,749 A | 8/1980 | Dare et al. | |
| 4,230,299 A * | 10/1980 | Pierce, Jr. | E21B 34/02 |
| | | | 137/315.28 |
| 4,240,455 A | 12/1980 | McGee | |
| 4,281,819 A * | 8/1981 | Linder | F16K 3/316 |
| | | | 251/282 |
| 4,414,995 A | 11/1983 | Spencer | |
| 4,423,748 A | 1/1984 | Ellett | |
| 4,436,279 A | 3/1984 | Bonds et al. | |
| 4,437,521 A | 3/1984 | Richardson et al. | |
| 4,445,424 A | 5/1984 | Foster et al. | |
| 4,590,823 A | 5/1986 | Neves et al. | |
| 4,612,983 A * | 9/1986 | Karr, Jr. | E21B 29/04 |
| | | | 166/55 |
| 4,619,434 A | 10/1986 | Snyder et al. | |
| 4,635,670 A * | 1/1987 | Kilmoyer | F16K 17/383 |
| | | | 137/75 |
| 4,649,704 A | 3/1987 | Marsh | |
| 4,650,151 A | 3/1987 | McIntyre | |
| 4,668,126 A | 5/1987 | Burton | |
| 4,671,312 A | 6/1987 | Bruton | |
| 4,744,386 A | 5/1988 | Frazer | |
| 4,753,292 A | 6/1988 | Ringgenberg et al. | |
| 4,771,805 A * | 9/1988 | Maa | F16K 3/0236 |
| | | | 137/454.6 |
| 4,790,378 A | 12/1988 | Montgomery et al. | |
| 4,809,733 A | 3/1989 | Hawkins | |
| 4,827,963 A * | 5/1989 | Baker | F16K 17/383 |
| | | | 137/75 |
| 4,830,107 A | 5/1989 | Rumbaugh | |
| 4,836,243 A | 6/1989 | Ferrell | |
| 4,878,651 A | 11/1989 | Meyer, Jr. | |
| 4,886,115 A | 12/1989 | Leggett et al. | |
| 4,921,207 A | 5/1990 | Baker | |
| 4,967,785 A | 11/1990 | Young | |
| 4,997,162 A | 3/1991 | Baker et al. | |
| 5,094,270 A * | 3/1992 | Reimert | F16K 3/029 |
| | | | 137/614.11 |
| 5,269,340 A | 12/1993 | Drzewiecki | |
| 5,501,424 A | 3/1996 | Williams et al. | |
| 5,803,431 A * | 9/1998 | Hoang | E21B 29/04 |
| | | | 251/326 |
| 5,845,708 A | 12/1998 | Burge et al. | |
| 5,894,771 A | 4/1999 | Braun et al. | |
| 5,938,175 A | 8/1999 | Young et al. | |
| 6,041,804 A | 3/2000 | Chatufale | |
| 6,109,353 A | 8/2000 | Edwards | |
| 6,209,650 B1 | 4/2001 | Ingebrigtsen et al. | |
| 6,223,825 B1 | 5/2001 | Ingebrigtsen et al. | |
| 6,260,822 B1 | 7/2001 | Puranik | |
| 6,457,370 B1 | 10/2002 | Okano | |
| 6,601,650 B2 | 8/2003 | Sundararajan | |
| 6,684,897 B2 | 2/2004 | Sundararajan | |
| 6,966,537 B2 | 11/2005 | Sundararajan | |
| 7,013,970 B2 | 3/2006 | Collie et al. | |
| 7,040,408 B2 | 5/2006 | Sundararajan | |
| 7,578,349 B2 | 8/2009 | Sundararajan | |
| 7,849,926 B2 | 12/2010 | Inderberg | |
| 8,091,861 B2 * | 1/2012 | Nesje | F16K 39/04 |
| | | | 251/282 |
| 9,732,576 B2 | 8/2017 | Rao | |
| 10,006,266 B2 | 6/2018 | Sundararajan | |
| 2019/0032793 A1 * | 1/2019 | Lah | F16K 3/30 |

FOREIGN PATENT DOCUMENTS

| | | |
|---|---|---|
| JP | 2014142001 | 8/2014 |
| RU | 2594450 | 8/2016 |

* cited by examiner

GATE VALVE

BACKGROUND

The present invention relates generally to valve assemblies and, more particularly, to an improved gate valve assembly.

Gate valves are used in the oilfield and have an internal sliding gate that controls fluid flow through the throughbore of the gate valve. The sliding gate is flat with an opening side and a blank sealing side. When the opening side of the gate is aligned with the throughbore then fluid is able to flow through the gate valve. When the blank sealing side of the gate is aligned with the wellbore, then fluid is prevented from flowing through the gate valve.

SUMMARY OF THE INVENTION

An objective of the present invention is to provide an improved gate valve assembly.

Another objective of the present invention is to provide a gate valve assembly with a body cavity that is at least partially rectangular to reduce weight of the valve body so the seats and gate can be slimmer than would be the case if the body cavity were round to even further reduce the weight.

Yet another object of the present invention is to provide a body cavity with a circular cavity on a first side and a rectangular cavity on the second side.

Another object of the present invention is to provide reduced sized seats for the gate valve assembly.

Still another object of the present invention is to provide bidirectional seals on the seats to assist sealing fluid flow within the well.

Yet another object of the present invention is to provide a skirt assembly to prevent contaminants from entering the body cavity to ensure reliable operations of the gate valve.

Yet another object of the present invention is to provide upstream and/or downstream sealing.

Yet another object of the present invention is to provide seals that operate in all ranges of temperature, pressure, and types of fluid that are encountered in oilfield applications.

While gate valves are much lighter than BOPs, another object would be to reduce the weight and size of the gate valve for the same size throughbore without sacrificing function. It would be desirable to reduce the number of parts and make the same size gate valve usable in many different applications.

In some cases, it is not known where the gate valve will be used or where it may be moved making selection of the proper seals problematic. Yet another object would be to be able to use the same gate valve for a desired throughbore size for all ranges of temperature, pressure, and types of fluid that are encountered in oilfield applications.

Another object is to have a gate valve that is bidirectional and has upstream sealing with downstream back up seals. However, it is also a possible object that the gate valve be convertible to downstream sealing by simply removing one or more seals because some users prefer to have only downstream sealing gate valves.

One general aspect includes a gate valve. The gate valve also includes a throughbore in the gate valve that extends through the gate valve. The valve also includes a body cavity in the gate valve which is oriented at a right angle to the throughbore. A gate is axially movable in the body cavity between an open position and a closed position along an axis. A stem connects to the gate with a stem-gate connection, the stem being on a first side of the throughbore. The body cavity on the first side of the throughbore may include a round cross-section portion and a first rectangular cross-section portion. The body cavity may include a second rectangular cross-section on a second side of the throughbore opposite to the first side. The second rectangular cross-section of the body receives a rectangular cross-section of the gate. The gate may include a gate opening that aligns with the throughbore in the open position and a blank portion that aligns with the throughbore in the closed position. The blank portion has two flat sides. The valve also includes a seat on both sides of the gate. The seat may have an opening therethrough and is in surrounding relationship to the throughbore. Each seat has a sealing end that engages one of the two flat sides of the gate when the gate valve is closed. Additionally, each seat has an outer end opposite to the sealing end that fits into a corresponding pocket in the gate valve. The gate width between the two flat sides of the blank portion of the gate is greater than the seat width between the sealing end and the outer end of each seat. Each seat may have at least one non-elastomeric U-shaped seal oriented so that the opening of the at least one non-elastomeric U-shaped seal on each seat is directed toward the gate and forms a downstream seal. Due to this, when the gate is closed the at least one non-elastomeric U-shaped seal on a downstream side of the gate is positioned to receive fluid pressure into the opening for sealing so that the gate valve forms a bi-directional gate valve with downstream sealing.

Implementations may include one or more of the following features of the gate valve where each seat may include two non-elastomeric U-shaped seals that are oriented so that openings of the non-elastomeric U-shaped seals are directed away from each other. Each U-shaped seal has a spring to urge legs of the non-elastomeric U-shaped seals outwardly. The two non-elastomeric U-shaped seals are positioned to form upstream and downstream seals. The gate valve may be a bi-directional gate valve with upstream and downstream sealing. A spring for each seat is positioned on the outer end to urge each seat towards the gate. A metallic flange is formed on the seat between the two non-elastomeric U-shaped seals. Two non-elastomeric support rings directly next to the metallic flange may be of a material to act as non-extrusion rings. One retainer ring has a leg that fits in a slot formed in the seat. The gate valve may include two metallic lips formed on the seat that retain the two non-elastomeric support rings and the two non-elastomeric U-shaped seals in place on the seat. The gate opening is adjacent to the stem-gate connection so that the gate opening is positioned between the blank portion and the stem-gate connection. The gate valve has a skirt plate on each side of the gate mounted to allow the gate to slide with respect to the skirt plate. The skirt plate on each side of the gate covers the gate opening when the gate is moved to the closed position. Each the skirt plate engages a corresponding seat. The stem-gate connection may include a latch without threads. The gate valve may have a gate width between the two flat sides being greater than the length between the sealing end and the outer end of each seat.

One general aspect includes a gate valve. The gate valve has a throughbore in the gate valve that extends through the gate valve. A body cavity in the gate valve is positioned at a right angle to the throughbore. The gate is movable in the body cavity between an open position and a closed position along an axis. The valve also has a stem connectable to the gate with a stem-gate connection where the stem is on a first side of the throughbore. The body cavity is on the first side of the throughbore and may include a round cross-section portion and a first rectangular cross-section portion. The body cavity has a second rectangular cross-section on a second side of the throughbore opposite to the first side. The second rectangular cross-section of the body receives a rectangular cross-section of the gate. The gate has a gate opening that aligns with the throughbore in the open position and a blank portion that aligns with the throughbore in the closed position. The blank portion has two flat sides. The valve also includes a seat on both sides of the gate. The seat has an opening therethrough and is in surrounding relationship to the throughbore. A spring is on an outer end of each seat. Each spring engages a corresponding wall on either side of the gate in the gate valve. Each spring urges a sealing end for each seat into engagement with one of the two flat sides of the gate when the gate valve is closed. The gate width between the two flat sides is greater than the length between the sealing end and the outer end of each seat. The valve also includes at least one non-elastomeric U-shaped seal mounted on at least one of the seats at a position to form a downstream seal.

Implementations may include one or more of the following features of the gate valve where each seat may include two non-elastomeric U-shaped seals oriented so that openings of the non-elastomeric U-shaped seals are directed away from each other. The two non-elastomeric U-shaped seals are positioned to form upstream and downstream seals. The gate valve is a bi-directional gate valve with upstream and downstream sealing. The gate valve may include a non-metallic retainer ring positioned around the outer end of the seat that engages one of the two non-elastomeric U-shaped seals. A metallic flange extends radially outwardly from each seat and is positioned between the two non-elastomeric U-shaped seals. A second non-metallic retainer ring is at the sealing end of the seat. The second non-metallic retainer ring may include a lip that extends into a groove formed around each seat. The gate valve may include two metallic grooves formed around each seat for each of the two non-elastomeric U-shaped seals and a metallic flange extending radially outwardly from each seat which is positioned between the two non-elastomeric U-shaped seals. The gate opening is adjacent to the stem-gate connection so that the gate opening is positioned between the blank portion and the stem-gate connection. The stem-gate connection may include a non-threaded latch. The gate valve may include a skirt plate on each side of the gate where the gate slides with respect to the skirt plate. The skirt plate on either side of the gate covers the gate opening when the gate is moved to the open position.

These and other objectives, features, and advantages of the present invention will become apparent from the drawings, the descriptions given herein, and the appended claims. However, it will be understood that above-listed objectives and/or advantages of the invention are intended only as an aid in understanding aspects of the invention, are not intended to limit the invention in any way, and therefore do not form a comprehensive or restrictive list of objectives, and/or features, and/or advantages.

BRIEF DESCRIPTION OF THE DRAWINGS

The following detailed description and claims are merely illustrative of the generic invention. Additional modes, advantages, and particulars of this invention will be readily suggested to those skilled in the art without departing from the spirit and scope of the invention. A more complete understanding of the invention and many of the attendant advantages thereto will be readily appreciated by reference to the following detailed description when considered in conjunction with the accompanying drawings, wherein like reference numerals refer to like parts and wherein:

DETAILED DESCRIPTION

Detailed descriptions of the invention are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Figure 1:
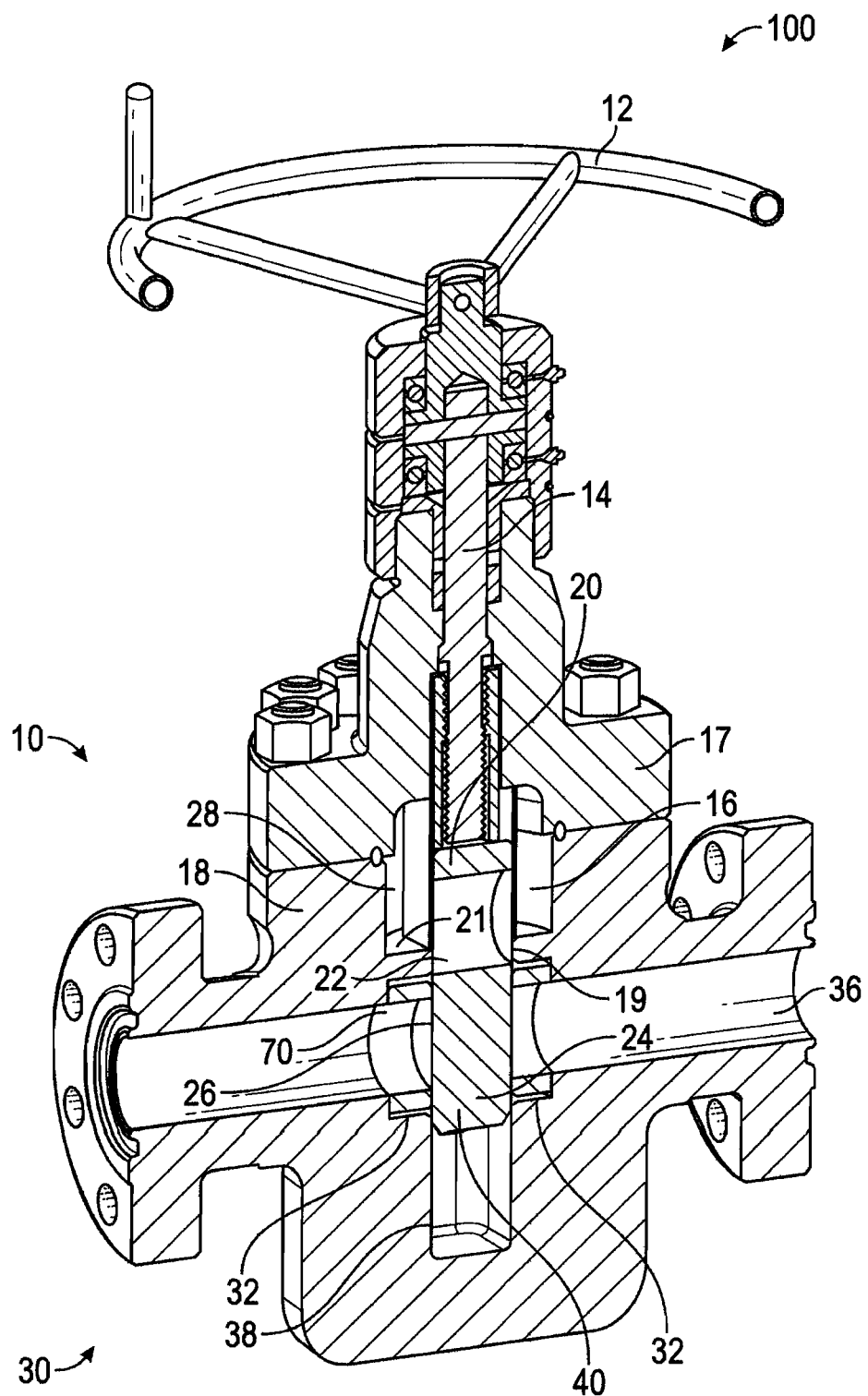
FIG. 1 is a perspective view of a gate valve with a rectangular lower body cavity and a round upper body cavity in accord with one embodiment of the present invention.
Figure 2:
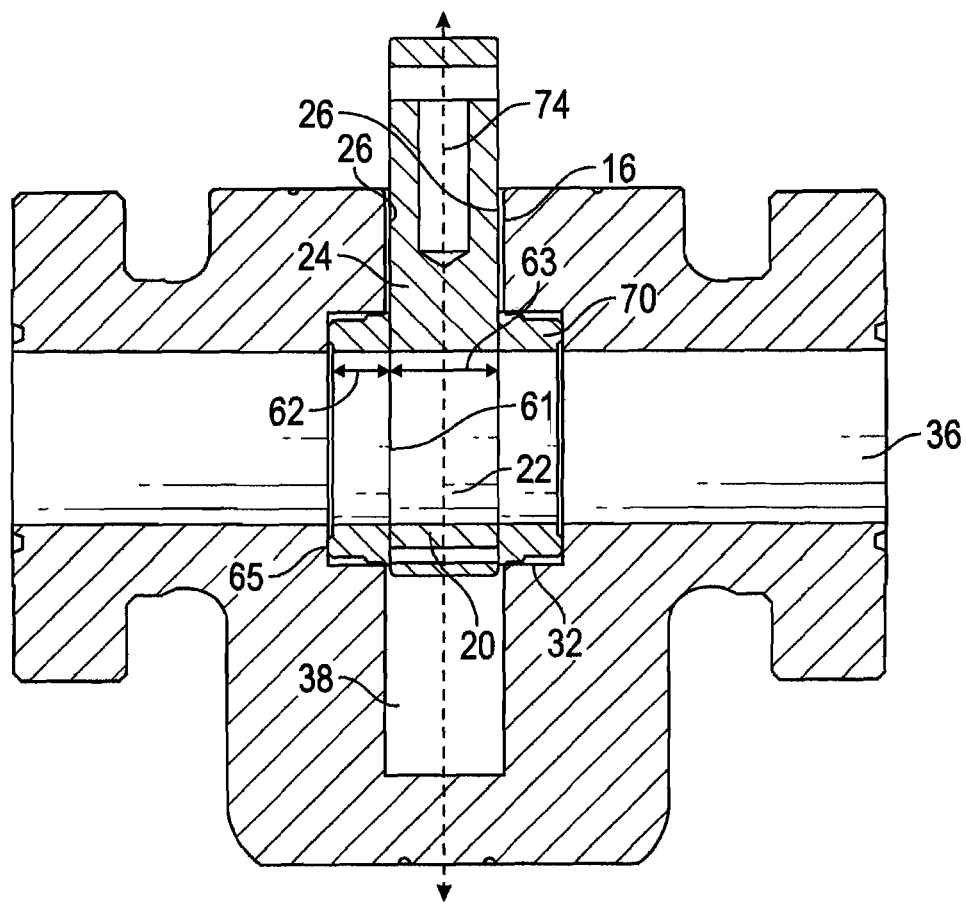
FIG. 2 is a side elevational view of a gate valve without the bonnet and showing a rectangular body cavity without a round body cavity in accord with one embodiment of the present invention.

Referring now to the drawings, and more particularly to FIG. 1, a gate valve 100 is shown with a valve body 18. Internal to valve body 18 is a body cavity 16 which comprises a round cross-section upper body cavity 28 and a rectangular cross-section lower body cavity 38. Throughbore 36, also round, extends through the gate valve 100 perpendicular to the body cavity 16. Bonnet 17 also defines a portion of round upper body cavity 28. A floor 21 is the bottom of the round body cavity 28 and the beginning of rectangular body cavity 38 and includes a rectangular throat portion 19 of body cavity 16 above throughbore 36. In other words, just above throughbore 36, there is a first rectangular cross-section portion of the body cavity but from floor 21 upwards as shown in the drawing, the body cavity 16 is round. While the entire upper body cavity 28 could be rectangular as shown in FIG. 2, it has been found advantageous that upper body cavity 28 is round as discussed hereinafter. The round body cavity may be either circular or elliptical.

The gate 20 comprises flat sides 26 which are in contact with the body cavity 16 and seats 70. In one possible embodiment, the gate 20 has an opening 22 on the upper portion of the gate. The opening 22 when aligned with the throughbore 36 is the open position of the gate valve 100 and allows fluid flow through the throughbore 36. A blank sealing surface 24 is on the opposite side of the gate 20 from the opening 22 blocks fluid flow and seals the throughbore 36 when aligned with the throughbore 36.

Gate 20 is provided with a round opening 22 the same size as throughbore 36 which allows fluid flow through the gate in an open position and stops fluid flow when in the closed position. In a preferred embodiment, this opening is located in an upper portion of the gate 20, when the gate is oriented upright as shown in the figures. One benefit of having the opening 22 at the top of the throughbore is the use of skirt 60 that reduces the amount of debris that enters body cavity 16. See FIGS. 10-12 that show skirt 60 surrounding the gate 20 in sliding engagement with the gate that prevents debris from collecting in or moving around the body cavity 16 during movement between the open to the closed position. Another practical benefit of having the opening at the top allows simplification across all gate valve sizes with reduced numbers of different parts required.

Seats 70 are positioned between the gate 20 and the valve body 18 on both sides of the gate 20. The gate engages the metal seats 70 to provide a metal to metal seal with the seats. The metal to metal seal operates over the wide range of temperature, pressure, and types of fluids that are encountered in oilfield operations. Leakage around seats 70 between the seats and the valve body 18 in pockets 32 is discussed hereinafter.

Gate valve 100 may be operated manually by use of a handle 12 which is rotated. However, a powered operator may also be utilized. In this case, handle 12 is connected to a valve stem 14 which rotates to raise or lower gate 20.

In more detail and continuing the discussion above, the body cavity 16 may be divided into two portions, an upper round or circular cavity side 28 above floor 21 and a lower rectangular cavity side 38 below floor 21. The upper body cavity 28 may have a circular cross-section, oval cross-section, elliptical cross-section or the like. While an oval cross-section may reduce the body size, number of bolts, and the like to maximize weight/size reduction it may be easier to manufacture using a circular cross-section body cavity.

An advantage of a round cross-section in upper body cavity 28 over a rectangular cross-section is that upper body cavity 28 may be better packed with grease or other suitable lubricants to ease movement and sealing of the gate within the cavity. It will be appreciated that due to the larger size of the upper circular body cavity 28 as compared to a rectangular upper body cavity, more grease may be utilized, which provides more lubrication and blocks debris from the fluid flow through throughbore 36. During opening and closing of the gate debris can make its way into the body cavity 16 due to accumulation in gate opening 22.

Figure 3:
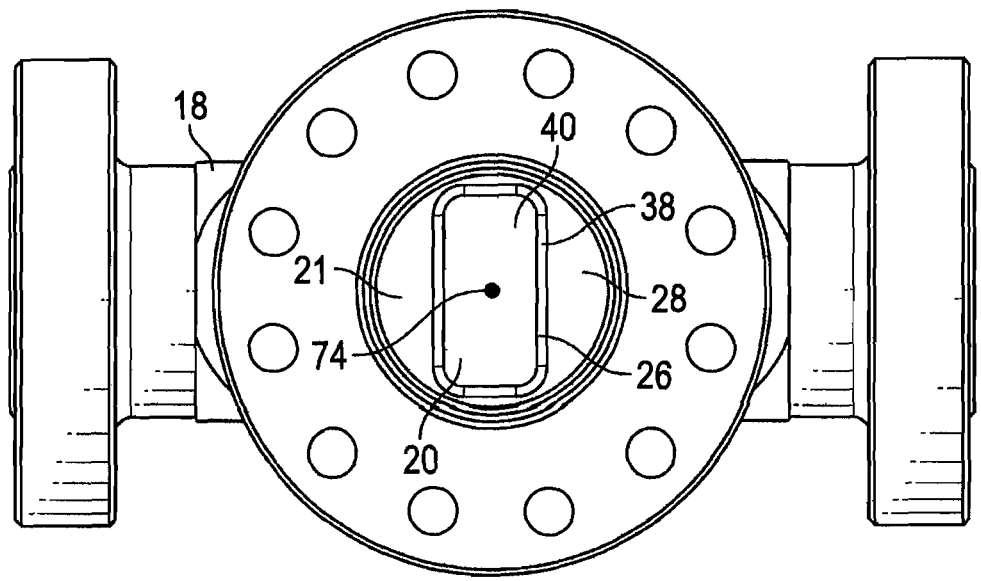
FIG. 3 is a top view looking down the body cavity through a circular upper body cavity to a lower rectangular body cavity for a gate valve assembly in accord with one embodiment of the present invention.

The gate 20 has a rectangular cross-section that fits snugly with the rectangular cross-section of lower body cavity 38. A view of the rectangular cross-section of the lower body cavity 38 is visible looking down into the valve (with the bonnet removed) from the top as shown in FIG. 3 A rectangular cross-section body cavity 38 which may also be referred to as a second rectangular cross-section portion, reduces the amount of material needed to construct the gate valve for the given size throughbore 36 and thereby reduces the weight. Another advantage of the rectangular body cavity is that it reduces the seat width 62 (see FIG. 2) required for the seats 70 because they do not have to be wide enough to extend through the radius of a circular body cavity before reaching the pocket 32 into which the seats 70 fit. This can also allow for a narrower gate 20 as discussed hereinafter.

Lower side 30 of the gate valve comprises the rectangular body cavity 38. As explained above, the use of a rectangular body cavity allows for the smaller seat width 62 (and weight) seats to be utilized and for a narrower gate. The seats may have a reduced seat width 62 (FIG. 2) extending outward from the gate and compared to the gate width 63 (FIG. 2). This in turn reduces the amount of materials needed, the costs required for construction, and reduces the overall weight of the gate valve.

Turning to FIG. 2, a side elevational view of gate valve 100 is shown in accord with one embodiment of the present invention. An axis 74 through the body cavity 16 is perpendicular to throughbore 36 and bisects body cavity 16. During opening and closing operation, gate 20 moves axially along axis 74. Axis 74 also bisects gate 20. In FIG. 2, gate 20 is axially positioned such that opening 22 is aligned with throughbore 36 thereby allowing fluid to flow through throughbore 36.

The seat width 62 is the distance between the sealing end 61 and the outer end 65 of each seat. In prior art systems, a rounded cavity is commonly used with the flat gate which in turn requires wider seats. In one embodiment, the gate width 63 between the two flat sealing sides 26 of gate 20 is greater than the seat width 62 between said sealing end 61 and the outer end 65 of each seat. Accordingly, the use of a rectangular body cavity provides the advantage of decreasing the amount of material necessary to make the enlarged size of a rounded body cavity, reducing weight, and size of the valve for the same size throughbore 36 and pressure rating of the gate valve. The weight of valve body 18 may be reduced by approximately 32% in this manner. In other possible embodiments, the amount of weight reduced may more or less than 32% as well.

As one example, a prior art round body cavity required a seat width of approx. 5.5 inches and a gate width of 4.5 inches for a valve with throughbore 36 diameter of 3 1/16 inches and 15K pressure rating. In the new design for the same size throughbore 36 with a rectangular body cavity, the gate could have a thickness 63 of 2.62 inches and the seat a thickness 62 of 1.6 inches. In this example the seat width is 62% of the gate width. Accordingly, the seat width is less than 100%, or less than 90%, or less than 80%, or less than 70%, or could be any percentage in this range, of the gate width. This saves not only the weight of the body but also reduces the weight of the gate and seat considerably. The gate has a thickness 63 less than the diameter of throughbore 36 and in this example is 85% of the throughbore or less than 90% of the throughbore.

FIG. 3 shows a top view of a gate valve body 18 for a gate valve assembly 100 looking down into body cavity 16 in accord with one embodiment of the present invention. The circular cavity 28 portion of body cavity 16 is formed within an upper portion of body 18 that bottoms at floor 21. Gate 20 is located within circular cavity 28 and rectangular body cavity 38. Gate 20 is rectangular with a rectangular cross section 40 perpendicular to axis 74. Gate 20 is comprised of flat sealing sides 26 that engage the seats (see FIGS. 1 and 2). The rectangular gate 20 fits snugly into the rectangular body cavity 38. The circular cavity 28 may also be packed with grease or other suitable lubricants allowing for smoother operation and less wear during movement of the gate within the body cavity while the gate moves from the open or closed positions. As noted above, having the upper body cavity being round allows for more grease than if the body cavity were also rectangular at the top of the valve. However, having a rectangular body cavity at the top of the valve would also be a possible design in accord with the present invention.

Figure 4:
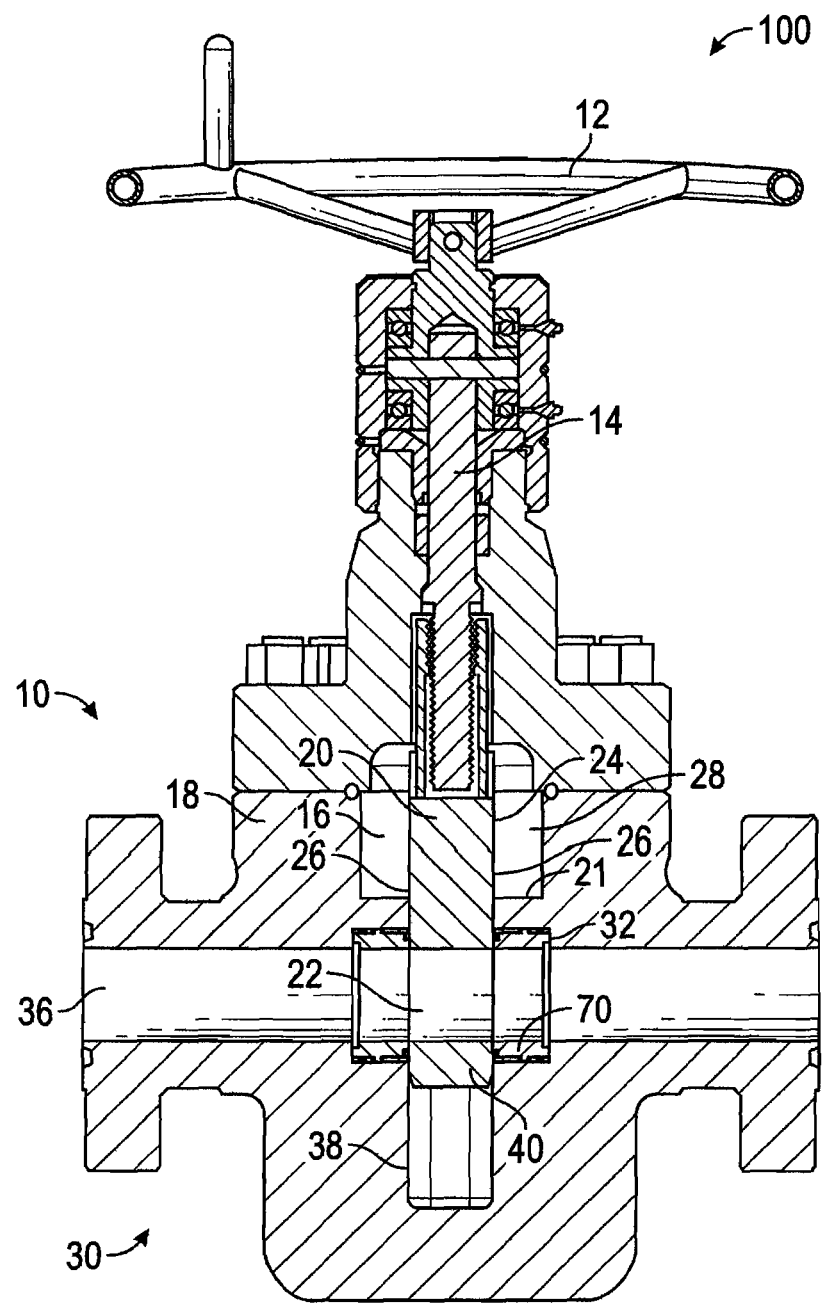
FIG. 4 is a side sectional view of a gate valve assembly showing slimmer seats on the side of the gate within the rectangular body cavity than is possible with a round body cavity in accord with one embodiment of the present invention.

Turning to FIG. 4, a side sectional view of gate valve 100 is shown in accord with one embodiment of the present invention. The body cavity 16 has a lower body cavity portion or rectangular body cavity 38 which is rectangularly shaped below the throughbore 36 on a second or lower side 30 of the gate valve. An upper body cavity portion of body cavity 16 comprises circular cavity 28 above floor 21 on a first or upper side 10 of the gate valve. In other embodiments, the upper body cavity portion may be oval or rectangular shaped.

In one embodiment, the lower portion of the body cavity on lower side 30 of the gate valve slidingly receives the rectangular gate 20 when the gate valve 100 is moved into the open position. In another possible embodiment, the gate 20 may have the opening 22 on the lower part of the gate with the blank on the upper side of the gate 20. As shown, the gate 20 is in the open position with opening 22 aligned with throughbore 36 thereby allowing fluid to flow. When desired or necessary, gate 20 may be lowered by turning handle 12 which is connected to stem 14 and further connected to the gate 20. The rectangular gate 20 will then move axially into rectangular cavity 38. It will also be appreciated that the seats 70 have a decreased width. The rectangular body cavity shape brings the seats 70 closer to the gate 20 and eliminates the need for seat retainers, which are used in some prior art gate valves.

Figure 5:
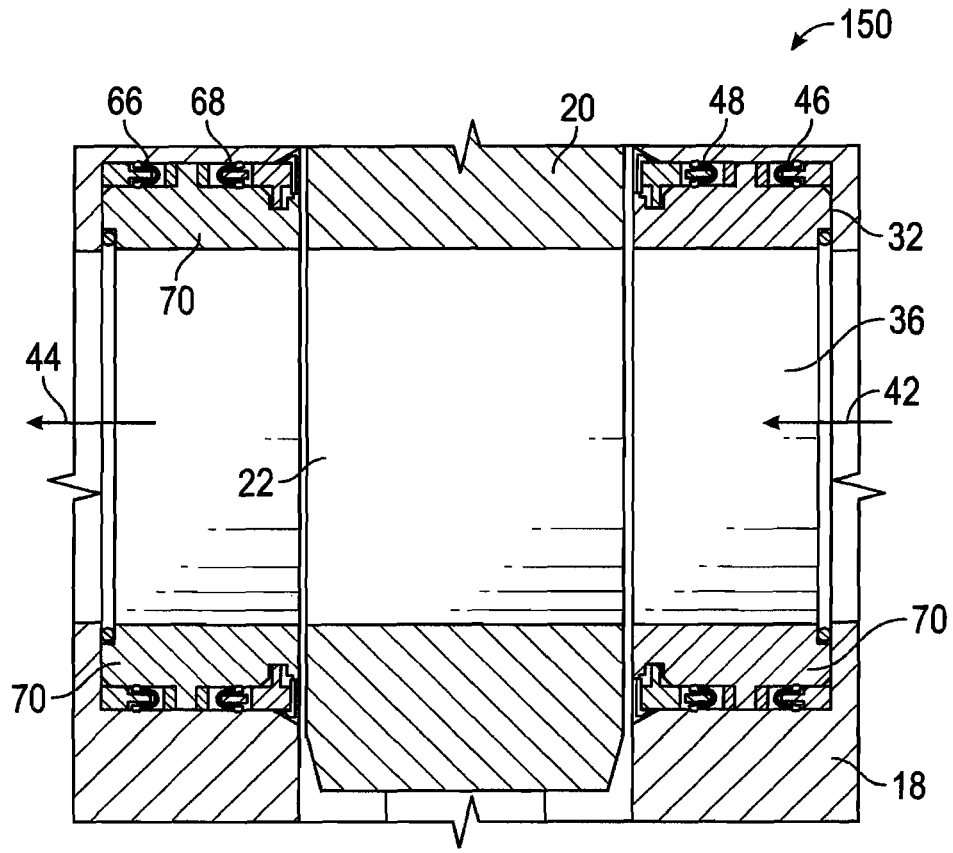
FIG. 5 is a side view of a gate valve showing two seats and seal assemblies on either side of the gate in a rectangular portion of the body cavity in accord with one embodiment of the present invention.

In FIG. 5, a side view of a seat assembly 150 is shown in accord with one embodiment of the present invention. As shown, gate 20 is in the open position with opening 22 aligned with throughbore 36. The seats 70 are mounted in pockets 32 in body 18. The upstream side is indicated by flow arrow 42 while the downstream side is indicated by flow arrow 44. When the gate 20 is moved to the closed position, the fluid flow in throughbore 36 is blocked by the flat sides of blank section 24 of gate 20 (see FIG. 1). The upstream seals 48, 46 and downstream seals 66 and 68 prevent fluid flow around the seats 70 between the seats and the valve body 18. However, only one upstream and one downstream seal are used for each flow direction.

For example, if the valve is closed then upstream seal 46 prevents fluid flow between the upstream seat and the body 18. If seal 46 fails, is inoperable, or is not installed, then fluid may flow past seal 48, around the upstream seat and around the gate 20 but is sealed off by downstream seal 68. In other words, the U-shaped upstream seal 48 and downstream U-shaped seal 68, which have their open end pointing towards the upstream flow block fluid flow as indicated by flow arrow 42. The use of two seals provides the benefit of greater sealing ability because of redundancy in the event the upstream seal does not stop fluid flow. In other words, if upstream seal 46 prevents fluid flow around upstream seat 70, then downstream seal 68 is not sealing or not at that moment used to stop the flow of fluid.

Some purchasers of valves prefer to have only bidirectional downstream sealing in the gate valve. In the above example, seals 46 and 66 are then removed so that only downstream sealing is utilized. In that way, when the valve is closed, downstream seal 68 will seal between the downstream seat and body 18 to prevent leakage past the downstream seat. If it were desired to have only bidirectional upstream sealing, then seals 48 and 68 could be used. If for some reason it were desired to have only a single direction of sealing, for example upstream sealing, then all seals except seal 46 might be removed. Thus, the seal configuration can be changed for user preference but for bidirectional redundant sealing all seals are installed.

It will be appreciated that if the fluid flow is reversed, then seal 66 becomes the upstream seal and seal 48 becomes the downstream backup seal around the seats. Therefore, the valve is bidirectional and operates effectively for fluid flow in either direction. Only two seals are operational depending on the direction of fluid flow in throughbore 36. This configuration is optimal for use in varying conditions.

Figure 6:
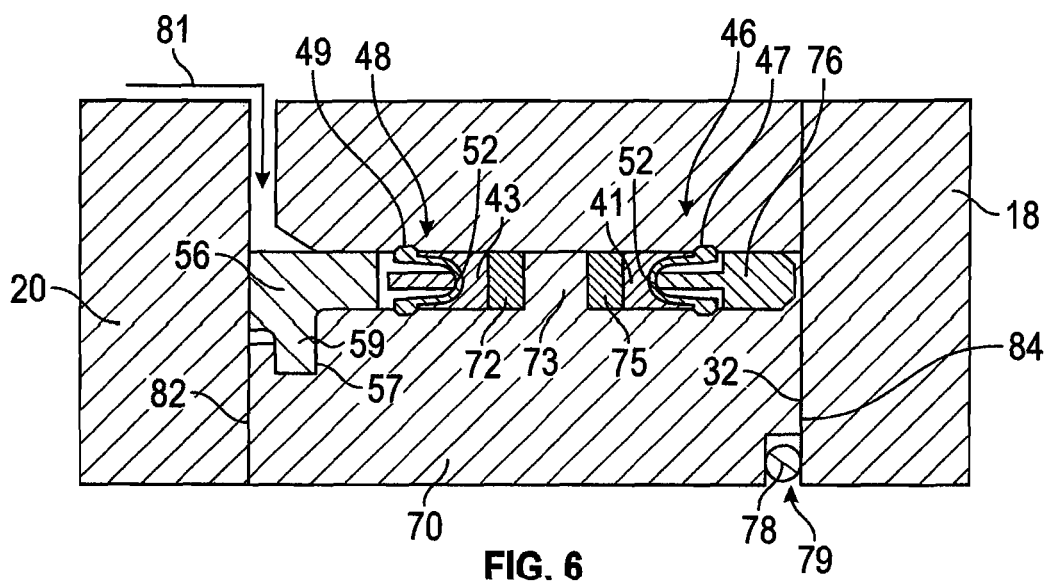
FIG. 6 is a side view of a possible seal assembly on one of the two seats of a gate valve assembly in accord with one embodiment of the present invention.
Figure 8:
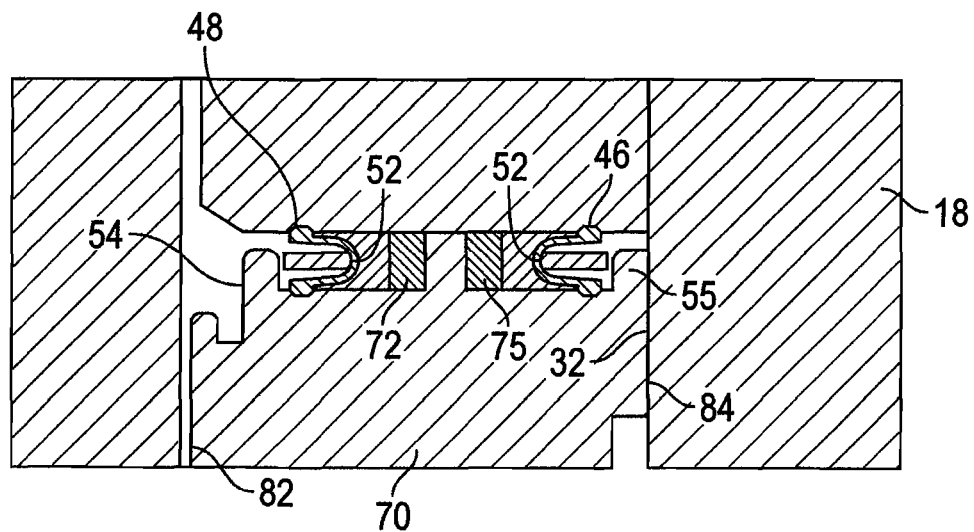
FIG. 8 is a side view of another possible seal assembly on one seat of a gate valve in accord with one embodiment of the present invention.

In FIG. 6 and FIG. 8, the components of the seat seals, 46 and 48 are shown in greater detail. Seat seals 66, 68 are the same construction. Each seat 70 comprises a metal seat body with a plurality of non-elastomeric seal members. In a preferred embodiment, the metal seat body of seat 70 itself is Inconel metal. The seal members comprise PTFE seals with stainless steel springs to energize the downstream seals and PEEK material support and retaining rings for both the upstream and downstream seals. By eliminating elastomeric O-rings, the gate valves will have a longer lifespan with less maintenance requirements while being able to withstand exposure to more extreme conditions. The temperature range of operation is then –50 degrees to 350 degrees F. The seal members are good for all or practically all fluids including corrosive and acidic fluids that will be encountered in the oilfield. Further the seals are good for all pressures up to 20,000 psi. As well, this material lasts a long time. Thus, the problems associated with choosing the correct O-ring for the pressures, fluids, and temperatures to be encountered is eliminated. As well, the problem of replacing seals on a regular basis due to age is eliminated.

Turning again to FIG. 6, an enlarged side view of a seat 70 is shown in accord with one embodiment of the present invention. If fluid attempts to flow behind seat 70 as indicated by arrow 79, then seal 46 prevents the fluid flow. This would be the situation discussed in FIG. 5 with fluid flow in throughbore 36 in the direction indicated at 42.

If fluid flow were in the opposite direction than as shown in FIG. 5, and has leaked through the upstream seal 66, then as indicated by fluid flow arrow 81 towards the seat 70, the fluid is directed towards the seal 48, which seals around the seat.

Figure 7:
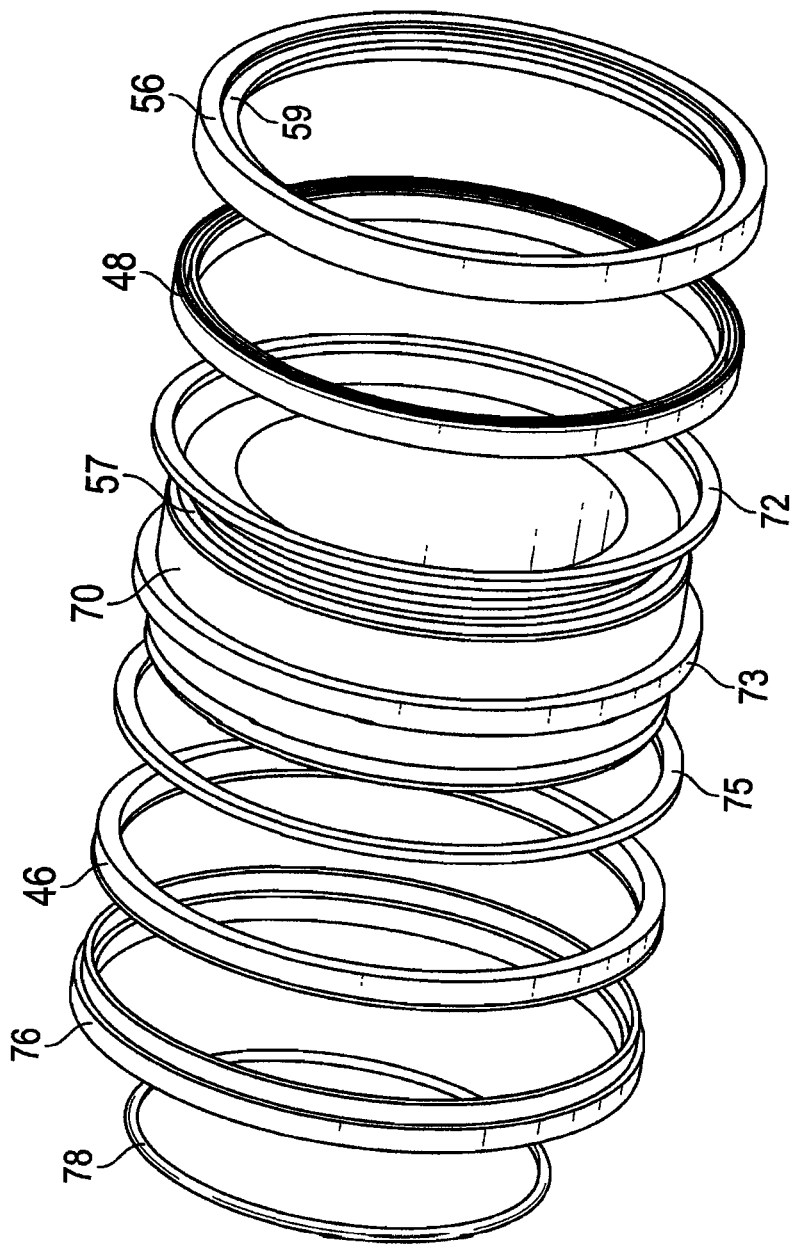
FIG. 7 is an exploded perspective view for one embodiment of a seat with seal assembly for a gate valve in accord with one embodiment of the present invention.

As shown perhaps better in FIG. 6 than FIG. 7, the seal assembly of U-shaped seal 48 and support ring 72 used with seat 70 on one side of metal flange 73 is held in place by retainer ring 56. Retainer rings may be non-metallic or non-elastomeric retainer rings. Retainer ring 56 is snapped or pressed into place by inserting leg 59, which extends from retainer ring 56, into slot 57. Retainer ring 56 maintains U-shaped seal 48 and support ring 72 in place against metal flange 73 of seat 70. Support ring 72 also preferably provides an anti-extrusion or non-extrusion function due to being comprised of a harder material than base regions 41 and 43 of U-shaped seals 46 and 48. Support rings may be non-elastomeric. In this embodiment, there is no need for retainer ring 76 to snap into place on the opposite side as retainer ring 56 because the valve body 18 is operable to maintain U-shaped seal 46 and corresponding support ring 75 in place. Support rings 72 and 75 are directly next to metallic flange 73 and between U-shaped seals 46 and 48. Sealing end or surface 82 of seat 70 engages one of the flat sides of gate 20 when the gate is closed to seal throughbore 36. Outer spring 78 at outer end 84 of seat 70 urges seat 70 against gate 20 to form an initial seal. The radial length of outer end 84 is greater than the radial length of sealing end 82 so that pressure between pocket wall 32 and outer end 84 produces a force pushing seat 70 towards gate 20 that keeps the seat firmly against the gate as pressure rises in throughbore 36 when the gate is closed.

As one possible example of operation, fluid flow in the direction of arrow 81 may flow pass retainer ring 56 to U-shaped seal 48 whereby the pressure of the fluid expands U-shaped seal 48 open to block the fluid from traveling beyond the seal. The actual seals 47 and 49 on the ends of leg expansion springs 52 are formed of PTFE as discussed above. Leg expansion springs 52 are utilized to retain the seal in engagement with the metal walls of pocket 32 and in the proper orientation for proper sealing. Springs 52 expand seals 47 and 49 that press against the body 18 within pocket 32 to create an initial seal. Pressure within the U-shaped seal 48 due to pressure in throughbore 36 urges the wings or legs of spring 52 open so that the seal 49 maintain the seal with higher pressures. The higher the pressure in throughbore 36, the greater the force created on seal 49 due to pressure within the U-shaped interior of the seal and thereby increases the openings of the U-shaped interior. Springs 52 may be constructed of a stainless steel or other suitable material.

Outer spring 78 is installed on the opposite side of seat 70 from gate 20 to create initial tension or pressure between the seat and gate 20 thereby creating an initial metal to metal seal between the flat side of gate 20 and the face or sealing end 82 of seat 70.

Turning to FIG. 7, an exploded perspective view of a seat 70 with sealing assembly is shown in accord with one possible embodiment of the present invention. The combination of seat 70 with the corresponding seals may be referred to as a seat assembly. As discussed above, the seat assembly is further comprised of an outer spring 78 that is utilized to press seat 70 against the gate to create an initial tension whereby an initial metal to metal seal is made between the gate surface and the metal surface of seat 70.

In one possible seal ring assembly embodiment, retainer ring 56 may be pressed into place to retain the position of the plurality of other rings and the seat into place against the valve body. Opposite retainer ring 56 is retainer ring 76. Seal rings 48 and 46 are operable to expand to stop fluid from flowing passed. The seals are operable for bidirectional sealing. These seal rings may be comprised of PTFE with stainless steel springs which aid in pressing the seals against the body for greater sealing ability. Polytetrafluoroethylene (PTFE) is a synthetic fluoropolymer of tetrafluoroethylene that has numerous applications. The use of PTFE versus prior art rubber rings allows for a greater range of temperatures, pressures, and conditions to be utilized. These seals may also be referred to as non-elastomeric seals. Non-elastomeric seals provide the advantage of lower maintenance needs and a wider temperature range than elastomers, as well as a wider range of chemical compatibility. Therefore, utilizing non-elastomeric seals will allow an operator to use one set of rings in a much wider variety of applications leading to reduced time in changing out seals, reduced maintenance costs, and increased operational flexibility. Anti-extrusion support rings 72, 75 and retaining rings 56 and 76 may be comprised of PEEK material. PEEK is a semicrystalline thermoplastic with excellent mechanical and chemical resistance properties that are retained to high temperatures.

In FIG. 6, outer retainer rings 56, 76, are used to form outer barriers that contain sealing rings 48, 46 on the seat 70, while in FIG. 8 the seat metal body itself comprises metallic outer barriers or lips that contain the sealing rings on seat 70.

Comparing FIG. 6 to FIG. 8, a different sealing assembly is shown. Fewer sealing rings are required because there is no need for outer seat retainer rings 56, 76 to hold the seat in arrangement with the gate. As can be seen in FIG. 8, retainer ring 56 is omitted using lip 54.

In this embodiment, U-shaped seal rings 46, 48 may be slidingly installed passed lip 54 using a cone shaped tool (not shown). In other words, the cone shaped tool has a smaller diameter onto which the U-shaped seal ring is placed and that smoothly increases in diameter to the diameter of the lip. The U-shaped seal slides along the cone shaped tool until it is compressed sufficiently to slip over the lip, such as metallic lip 54 near the sealing side or metallic lip 55 on the opposite side. If it is attempted to install the U-shaped seal ring without the tool it is very likely that the U-shaped seal will be damaged because the U portion is pressed together hard due to the lip being sized to be at the outer range of circumference that the diameter of the U-shaped seal can be slipped over without damage.

Lip 54 protrudes into the channel or gap to allow the seals to be slid into place while also performing the function of the retaining ring 56 (FIG. 6) which is no longer needed. Additionally, on the opposite end relative lip 54, retaining ring 76 has been omitted. Likewise, lip 55 has been added similar to lip 54 to perform the function of the retaining ring which has been removed in this embodiment. Therefore, fewer parts are required for assembly while retaining the same functionality.

Figure 9:
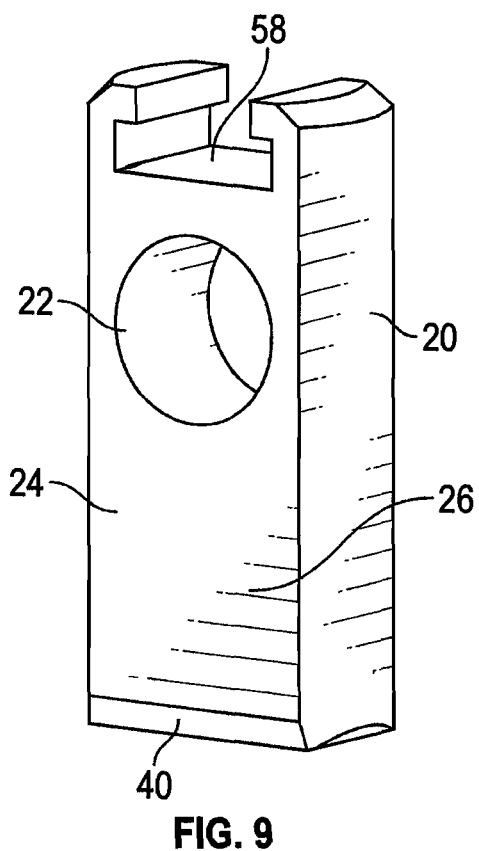
FIG. 9 is a perspective view of a T-slot connector gate that slidingly fits onto a T-shaped stem connector for a gate valve in accord with one embodiment of the present invention.

In FIG. 9, a perspective view is shown of a gate for a gate valve in accord with one embodiment of the present invention. In one possible embodiment, gate 20 is generally rectangular comprising flat sides 26 and rectangular cross section 40 as discussed previously. Gate 20 has an opening 22 and a blank sealing region 24 which when aligned with the throughbore will either provide sealing or allow the flow of fluid through the throughbore. As discussed above, the seats make a metal-to-metal seal with the blank sealing region 24. When the gate is oriented vertically, a T-slot which may also referred to as a stem connector, gate connector, stem-gate connection, or latch 58 may be positioned at the top. The connector 58 may be milled or forged into the gate 20. The connector 58 also has a reciprocal connector on the stem to be inserted into the connector 58. The T-slot 58 may be a non-threaded latch to allow the stem to be slid or pressed into the connection on the gate 20. This type of connector may provide added strength and rigidity to the gate and connection between the gate and the stem and additionally decreased time may be required to assemble the gate valve.

Figure 10:
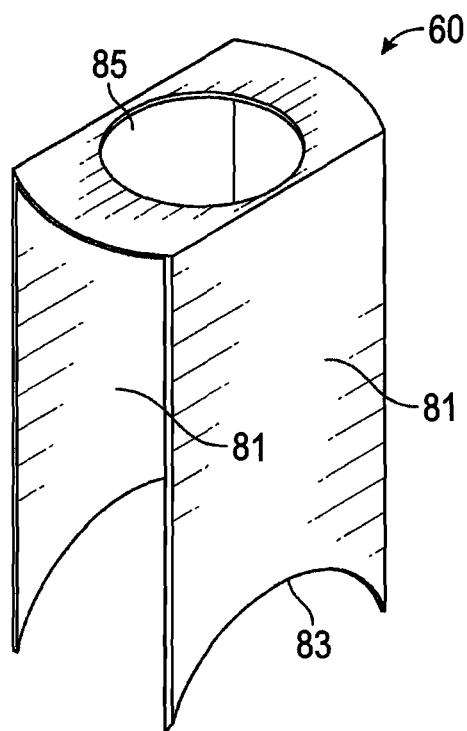
FIG. 10 is a perspective view of a skirt assembly to prevent or limit debris from entering the body cavity for a gate valve in accord with one embodiment of the present invention.
Figure 11:
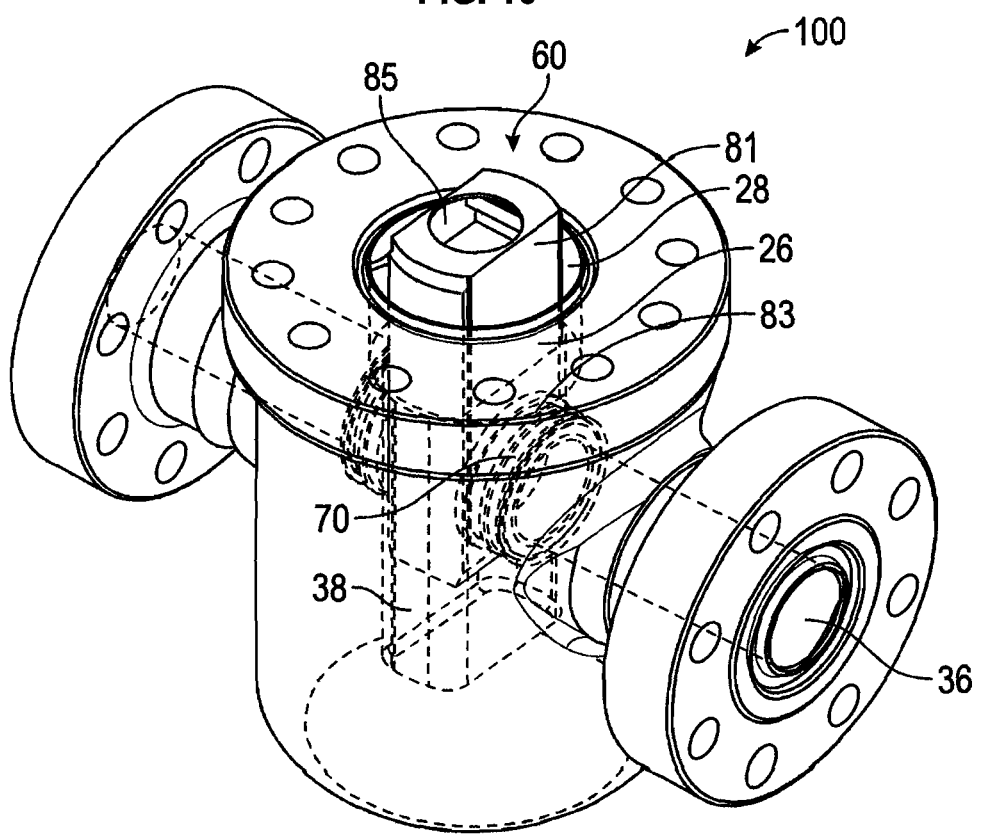
FIG. 11 is a partial sectional perspective view of a skirt assembly inserted into the round and rectangular portions of the body cavity to prevent debris from entering the body cavity when opening and closing the gate for a gate valve in accord with on embodiment of the present invention.
Figure 12:
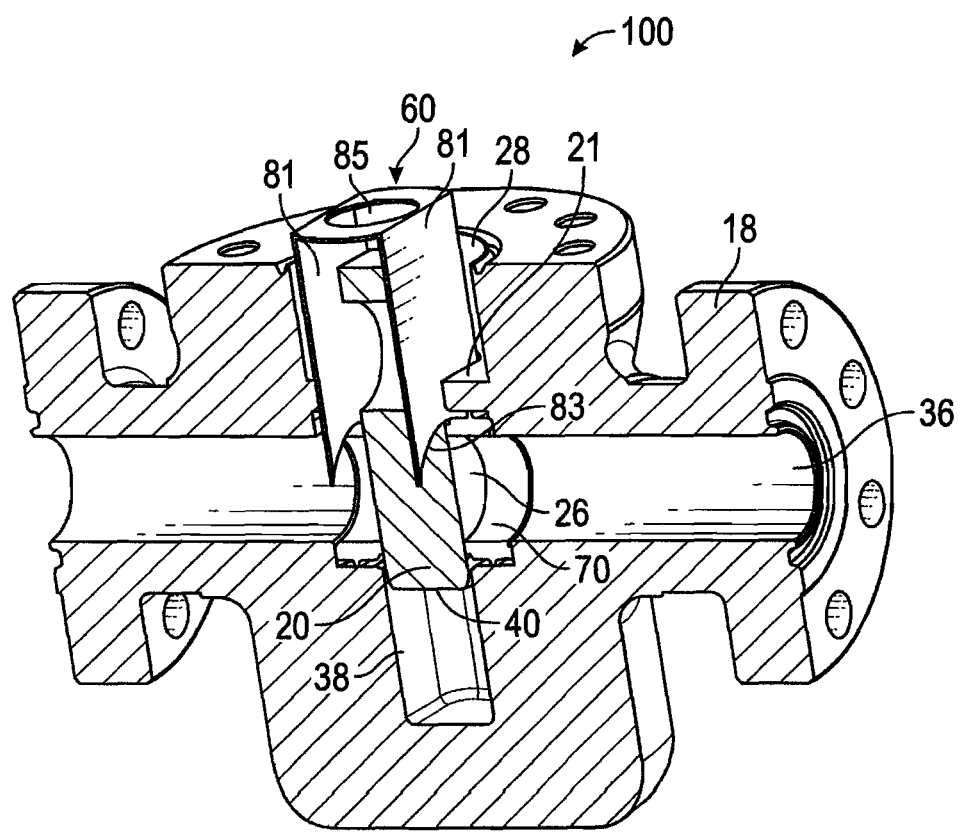
FIG. 12 is a cross-sectional view of the skirt assembly inserted into round and rectangular portions of the body cavity of a gate valve in accord with one embodiment of the present invention.

Turning to FIGS. 10-12, various views of a skirt assembly for gate valve 100 are shown in accord with one embodiment of the present invention. Skirt 60 covers the opening 22 of the gate 20 when the gate is closed. In this way, skirt 60 prevents dirt, debris, and the like that may be caught in opening 22 during operation from entering the body cavity 16 when the valve is closed. This prevents dirt or debris from contaminating the body cavity which may lead to clogging, impairing, or otherwise hampering the operation of the gate valve. Additionally, the use of skirt 60 ensures proper operation and increases operational time while decreasing down time required to clean and maintain the gate.

In one possible embodiment, as shown in FIG. 10, skirt 60 is constructed of a rectangular frame complementary to the gate 20. As seen in FIGS. 11-12, Skirt 60 is inserted into body cavity 16 and over gate 20 where it is fixed in place with respect to valve body 18. Skirt 60 has two sides or skirt plates 81 that slidingly engage the gate thereby sealing the cavity from contamination. Skirt 60 comprises two semi circular recesses 83 to allow close engagement with the seats 70. The skirt has a circular opening 85 at the top to allow connection of the stem and gate. Skirt 60 may be comprised of metal or other suitable material that is resilient enough to withstand the pressures and temperatures present during well operations.

In FIG. 12, it can be seen that the two sides 81 of skirt 60 extend through the circular or rounded cavity 28, past floor 21 of rounded cavity 28 and into engagement with the seats 70. As explained above, when the gate is opened and debris is trapped in the opening 22 of the gate, then sides 81 prevent debris from entering the body cavity. As also discussed above, the body cavity is preferably filled with grease to further prevent debris from entering the body cavity When comparing the prior art valves with the present invention, the gate and seats of the improved gate valve assembly are both slimmer, as the body cavity size is decreased overall. This provides advantages of decreased weight and size for a particular throughbore size, operation in a very wide range of temperature, pressure, and fluid. As well there is a limited need for maintenance. Further, the reduced number of parts and much wider range of temperature, pressure, and fluid operation allows the same valve to be used in many different types of applications. This reduces engineering costs required to build each valve for specific applications and even allows the ability to keep the valves in stock. This makes making delivery much faster.

In summary, gate valve 100 utilizes a rectangular lower body cavity 38. The upper body cavity 28 may be round. Seats 70 are narrow and may be quite smaller in width than gate 20. Non-elastomeric U-shaped seals provide bidirectional upstream sealing with downstream backup sealing. Skirt 60 prevents debris from entering the body cavity 16.

The foregoing disclosure and description of the invention is illustrative and explanatory thereof, and it will be appreciated by those skilled in the art, that various changes in the size, shape and materials as well as in the details of the illustrated construction or combinations of features of the various coring elements may be made without departing from the spirit of the invention. Moreover, the scope of this patent is not limited to its literal terms but instead embraces all equivalents to the claims described.

The invention claimed is:

1. A gate valve, comprising:
   a throughbore in said gate valve that extends through said gate valve;
   a body cavity in said gate valve that is oriented transversely to said throughbore;
   a gate movable in said body cavity between an open position and a closed position, said body cavity in said gate valve extending from above said throughbore to below said throughbore when said gate valve is upright;
   said gate comprising a gate opening that aligns with said throughbore in said open position, said gate further comprising a blank portion that aligns with said throughbore in said closed position;
   a plate mounted in said body cavity on each side of said gate so that said gate is moveable with respect to each said plate, a top plate that connects to each said plate, said top plate further comprising an opening therein, each said plate being sized and positioned to cover said gate opening when said gate is moved to said closed position, each said plate being positioned to limit debris movement between said gate opening and said body cavity; and
   said gate is mounted so that when said gate valve is upright and in the closed position then said gate opening is above said throughbore.

2. The gate valve of claim 1, further comprising a seat on both sides of said gate, each said seat comprising an opening therethrough and being in surrounding relationship to said throughbore, each said seat comprising a gate engagement end that engages one side of said gate, each said plate being mounted on each side of said gate comprising an end that engages a corresponding seat to support each said plate within said body cavity.

3. The gate valve of claim 1 further comprising a stem being connected to said gate with a stem-gate connection, said stem being above said throughbore when said gate valve is upright wherein said stem-gate connection comprises a latch without threads, said stem or said stem-gate connection extending through said opening in said top plate.

4. The gate valve of claim 1 wherein said body cavity comprises an additional portion that comprises at least two flat sides below said throughbore when said gate valve is upright that slidingly receive said gate.

5. A gate valve, comprising:
   a throughbore in said gate valve that extends through said gate valve;
   a body cavity in said gate valve is oriented transversely to said throughbore, said body cavity extending from above said throughbore to below said throughbore when said gate valve is upright;
   a gate is axially movable in said body cavity between an open position and a closed position along an axis through said body cavity;
   a stem connects to said gate;
   said gate comprising a gate opening that aligns with said throughbore in said open position and a blank portion that aligns with said throughbore in said closed position, said blank portion comprising two sides;
   a plate mounted in said body cavity on each side of said gate so that said gate is moveable with respect to each said plate, a top plate that connects to each said plate, said top plate further comprising an opening therein, each said plate being sized and positioned to cover said gate opening when said gate is moved to said closed position, each said plate being positioned to limit debris movement between said gate opening and said body cavity;
   said gate is mounted so that when said gate valve is upright and in the closed position then said gate opening is above said throughbore; and
   said body cavity comprising a cross-section below said throughbore when said gate valve is upright that comprises two flat sides that receive said two sides of said blank portion of said gate.

6. The gate valve of claim 5, further comprising a seat on both sides of said gate, each said seat comprising an opening therethrough and being in surrounding relationship to said throughbore, each said seat comprising a sealing end that engages one of said two flat sides of said blank portion of said gate when said gate valve is closed and wherein each said plate engages a corresponding seat, said stem being above said throughbore when said gate valve is upright, said gate opening is positioned between said blank portion and a stem-gate connection.

7. The gate valve of claim 6 wherein a stem-gate connection comprises a latch without threads.

8. The gate valve of claim 6 comprising a gate width between said two sides of said blank portion of said gate being greater than a length between said sealing end and an outer end of each said seat, each said seat comprising an outer end opposite to said sealing end that fits into a corresponding pocket in said gate valve.

9. The gate valve of claim 5 wherein an upper portion of said body cavity above said throughbore comprises a floor that extends inwardly within said body cavity, said floor comprises ends comprising flat sides that engage each said plate.

10. The gate valve of claim 9 further comprising said body cavity above said throughbore comprises a round cross-section portion above said floor.

11. A gate valve, comprising:
a throughbore in said gate valve that extends through said gate valve;
a body cavity in said gate valve is oriented transversely to said throughbore, said body cavity extending from above said throughbore to below said throughbore when said body cavity is upright, said body cavity above said throughbore comprises two flat surfaces;
a gate is axially movable in said body cavity between an open position and a closed position along an axis through said body cavity, said two flat surfaces being spaced apart by approximately a gate width wherein said gate width is measured in a direction transversely to said axis;
a stem connects to said gate;
said gate comprising a gate opening that aligns with said throughbore in said open position and a blank portion that aligns with said throughbore in said closed position, said blank portion comprising two sides; and
a plate mounted in said body cavity on each side of said gate so that said gate is moveable with respect to each said plate, a top plate that connects to each said plate, said top plate further comprising an opening therein, each said plate being sized and positioned to cover said gate opening when said gate is moved to said closed position, each said plate being positioned to limit debris movement between said gate opening and said body cavity; and
said gate is mounted so that when said gate valve is upright and in the closed position then said gate opening is above said throughbore.

12. The gate valve of claim 11 wherein said two flat surfaces are positioned at respective ends of a floor within said body cavity above said throughbore.

13. The gate valve of claim 11, further comprising, a seat on both sides of said gate, each said seat comprising an opening therethrough and being in surrounding relationship to said throughbore, each said seat comprising a sealing end that engages one of said two sides of said gate, each said plate engages a corresponding seat, said gate opening is adjacent to a stem-gate connection so that said gate opening is positioned between said blank portion and said stem-gate connection.

14. The gate valve of claim 13 wherein said stem-gate connection comprises a latch without threads.

15. The gate valve of claim 13 comprising a gate width between said two sides of said blank portion of said gate that is greater than a length between said sealing end and an outer end of each said seat, each said outer end fits into a corresponding pocket in said gate valve.

16. The gate valve of claim 11 further comprising a second portion of said body cavity below said throughbore when said gate valve is upright that also comprises at least two flat sides that slidingly receive said two sides of said blank portion of said gate.

17. The gate valve of claim 11, further comprising said body cavity above said throughbore when said gate valve is upright comprises a round cross-section portion and another portion that comprises said two flat surfaces.

18. The gate valve of claim 11, wherein said two flat surfaces being slidingly engageable with a respective of each said plate on each side of said gate.

19. The gate valve of claim 18 further comprising said combination of said top plate and each said plate being comprised of a resilient material.

20. The gate valve of claim 11, further comprising said stem being mounted above said throughbore when said gate valve is oriented upright, said stem is mounted to be moveable along said axis.

21. The gate valve of claim 11 wherein said body cavity above said throughbore comprises an oval shape.

22. The gate valve of claim 11, wherein said two flat surfaces extend over a substantial portion of said body cavity above said throughbore.

23. The gate valve of claim 13, further comprising a semi-circular end on said at least one plate that engages a respective seat.

24. The gate valve of claim 11, further comprising that said two plates are each connected to an end of an additional metallic plate.

* * * * *